No. 846,997. PATENTED MAR. 12, 1907.
H. P. & H. HAMILTON.
PRINTER'S INK ROLLER CABINET.
APPLICATION FILED JULY 18, 1906.
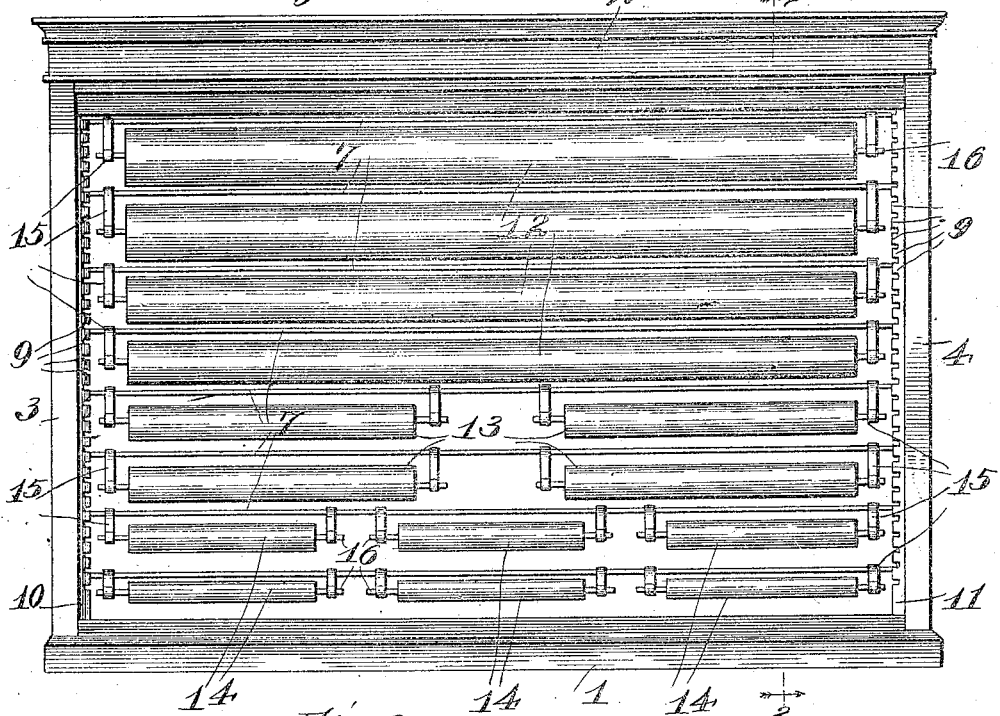
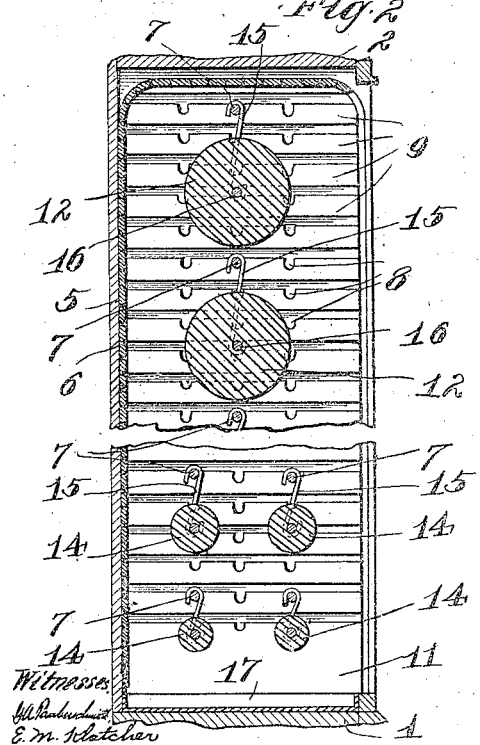
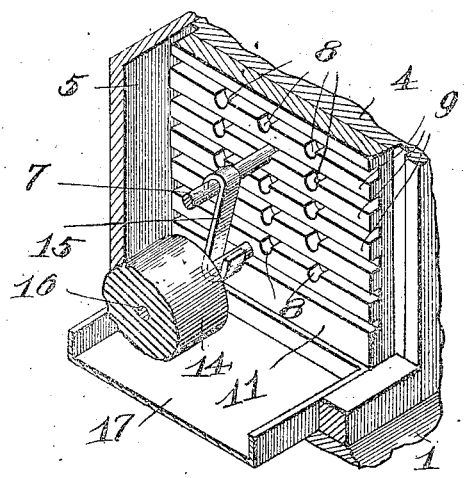
Inventors:
Henry P. Hamilton,
Hubbard Hamilton,
By Geo. E. Waldo,
Atty

UNITED STATES PATENT OFFICE.

HENRY P. HAMILTON, OF TWO RIVERS, WISCONSIN, AND HUBBARD HAMILTON, OF DETROIT CITY, MINNESOTA, ASSIGNORS TO THE HAMILTON MANUFACTURING COMPANY, OF TWO RIVERS, WISCONSIN, A CORPORATION OF WISCONSIN.

PRINTER'S INK-ROLLER CABINET.

No. 846,997. Specification of Letters Patent. Patented March 12, 1907.

Application filed July 18, 1906. Serial No. 326,718.

*To all whom it may concern:* spection of the drawing without a more decontain water, evaporation of which when the cabinet is closed will operate to maintain the atmosphere within the cabinet practically saturated with moisture, and thus to maintain the rolls inclosed therein moist and soft and in condition to do the best possible work.

We claim—

1. A cabinet for ink-rollers, comprising suitable inclosing walls one of which is adapted to open and close to render the interior of said cabinet accessible, supports secured to the end walls of said cabinet, rods which extend across said cabinet the ends of which engage said supports and double hooks adapted, respectively, for engagement with said rods and with the ends of the stocks of the ink-rollers.

2. A cabinet for ink-rollers, comprising suitable inclosing walls, one of which is adapted to open and close to render the interior of said cabinet accessible, supports secured to the end walls of said casing and forming series extending both vertically and from front to back thereof, rods which extend across said cabinet the ends of which are interchangeable in said supports, and double hooks adapted, respectively, for engagement with said rods and with the ends of the stocks of the ink-rollers.

3. A cabinet for ink-rollers, comprising suitable inclosing walls, one of which is adapted to open and close to render the interior of said cabinet accessible, supports secured to the end walls of said cabinet, rods which extend across said cabinet the ends of which engage said supports and double hooks adapted, respectively, for engagement with said rods and with the ends of the stocks of the ink-rollers, and a water-tight pan at the bottom of said cabinet.

4. A cabinet for ink-rollers, comprising suitable inclosing walls, one of which is adapted to open and close to render the interior of said cabinet accessible, supports secured to the end walls of said casing and forming series extending both vertically and from front to back thereof, rods which extend across said cabinet the ends of which are interchangeable in said supports, double hooks adapted, respectively, for engagement with said rods and with the ends of the stocks of the ink-rollers, and a water-tight pan at the bottom of said cabinet.

5. A cabinet for ink-rollers, comprising suitable inclosing walls, one of which is adapted to open and close to render the interior of said cabinet accessible, cleats secured to the end walls of said casing provided with notches in their upper edges, rods which extend across said cabinet the ends of which are interchangeable in said notches and double hooks, adapted, respectively, for engagement with said rods and with the ends of the stocks of the ink-rollers.

6. A cabinet for ink-rollers, comprising suitable inclosing walls, one of which is adapted to open and close to render the interior of said cabinet accessible, cleats secured to the end walls of said casing provided with notches in their upper edges, rods which extend across said cabinet, the ends of which are interchangeable in said notches, double hooks respectively adapted for engagement with said rods and with the ends of the stocks of the ink-rollers, and a water-tight pan in the bottom of said cabinet.

In testimony that we claim the foregoing as our invention we affix our signatures, in presence of two subscribing witnesses, this 9th day of July, A. D. 1906.

HENRY P. HAMILTON.
HUBBARD HAMILTON.

Witnesses to signature of Henry P. Hamilton:
  CHAS. KRAUSE,
  A. H. LOHMAN.

Witness to signature of Hubbard Hamilton:
  P. S. CONVERSE,
  GEO. D. HAMILTON.